(12) United States Patent
Walsh

(10) Patent No.: US 10,120,067 B2
(45) Date of Patent: Nov. 6, 2018

(54) RANGE DATA COMPRESSION

(71) Applicant: LEICA GEOSYSTEMS AG, Heerbrugg (CH)

(72) Inventor: Gregory Charles Walsh, Walnut Creek, CA (US)

(73) Assignee: LEICA GEOSYSTEMS AG, Heerbrugg (CH)

(*) Notice: Subject to any disclaimer, the term of this patent is extended or adjusted under 35 U.S.C. 154(b) by 541 days.

(21) Appl. No.: 14/826,427

(22) Filed: Aug. 14, 2015

(65) Prior Publication Data
US 2016/0061940 A1 Mar. 3, 2016

Related U.S. Application Data

(60) Provisional application No. 62/043,981, filed on Aug. 29, 2014.

(51) Int. Cl.
| G01C 3/08 | (2006.01) |
| G01S 7/481 | (2006.01) |
| G01S 17/42 | (2006.01) |
| G01S 7/48 | (2006.01) |
| G01S 17/89 | (2006.01) |

(52) U.S. Cl.
CPC .......... *G01S 7/4817* (2013.01); *G01S 7/4808* (2013.01); *G01S 17/42* (2013.01); *G01S 17/89* (2013.01)

(58) Field of Classification Search
CPC ...... G01S 7/4817; G01S 7/4808; G01S 17/42; G01S 17/89
See application file for complete search history.

(56) References Cited

U.S. PATENT DOCUMENTS

| 5,321,259 A * | 6/1994 | Morgan ............... B23K 9/1274 |
| | | 250/236 |
| 7,317,456 B1 | 1/2008 | Lee |
| 2011/0010400 A1 | 1/2011 | Hayes |
| 2011/0202358 A1 | 8/2011 | Neuendorf et al. |
| 2013/0294706 A1 | 11/2013 | Maurer et al. |
| 2014/0229453 A1 | 8/2014 | Kozak et al. |
| 2014/0278137 A1 * | 9/2014 | Goldstein ............... G06F 19/22 |
| | | 702/19 |

OTHER PUBLICATIONS

European Search Report dated Nov. 17, 2015 for European Patent Application No. 15181883.8 filed Aug. 20, 2015.

* cited by examiner

Primary Examiner — Samantha K Abraham
(74) Attorney, Agent, or Firm — Maschoff Brennan

(57) ABSTRACT

A laser imaging, detection, and ranging (LIDAR) system may include a scanner and a compression module. The scanner may be configured to generate a scan including multiple range values associated with multiple scan points of the scan. The compression module may be configured to map multiple range values to multiple integers. The multiple integers may represent multiple range intervals. The multiple range intervals may include multiple differently sized range intervals. The size of the range intervals may be a function of range according to an interval size function.

20 Claims, 6 Drawing Sheets

RANGE DATA COMPRESSION

CROSS-REFERENCE TO RELATED APPLICATIONS

This application claims priority to U.S. Provisional Application No. 62/043,981, filed Aug. 29, 2014, titled RANGE DATA COMPRESSION, which is incorporated herein by reference in its entirety.

BACKGROUND

The present disclosure generally relates to range data compression. Scanning devices for capturing three-dimensional reality using laser imaging, detection, and ranging (LIDAR) techniques such as those described in U.S. Pat. Nos. 7,701,558 and 5,988,862 have been growing in popularity and usage.

The claimed subject matter is not limited to embodiments that solve any disadvantages or that operate only in environments such as those described above. This background is only provided to illustrate examples of where the present disclosure may be utilized.

SUMMARY

The present disclosure generally relates to range data compression.

In some embodiments, a laser imaging, detection, and ranging (LIDAR) system may include a scanner and a compression module, which may be located on the scanner or used to compress the scan data later. The scanner may be configured to generate a scan including multiple range values associated with multiple scan points of the scan. The compression module may be configured to map multiple range values to multiple integers. The multiple integers may represent multiple range intervals. The multiple range intervals may include multiple differently sized range intervals. The size of the range intervals may be a function of range according to an interval size function.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description that follows, and in part will be obvious from the description, or may be learned by practice. The features and advantages may be realized and obtained by means of the instruments and combinations particularly pointed out in the appended claims. These and other features will become more fully apparent from the following description and appended claims.

DETAILED DESCRIPTION

Generally, scanning devices for capturing three-dimensional reality may include some form of laser imaging, detection, and ranging (LIDAR) that generates one or more range samples of one or more target surfaces. The LIDAR may also generate ancillary data associated with the samples, such as a measure of the return intensity of the laser, described as "active color" and/or the color of the sampled surface described as "passive color." Intensity may refer to the light returned from the surface from the laser, which may include several distinct wavelengths. Color may refer to light passively returned from a surface, which may be composed of one or more distinct bands of interest as with hyper spectral and/or thermal imaging.

The LIDAR may be mechanically positioned by the laser scanner to sample a region of interest over time. The mechanical positioning of the LIDAR is described as scanning. The positioning process may determine an origin and direction of the LIDAR sample. Together with the range(s), the origin and the direction may be employed to generate sample point(s) in a base coordinate system. Each sample point, together with its ancillary data such as return intensity and/or color, may be described as a scan point. A collection of scan points may be described as a scan. The scan may include scan lines, each of which may include a collection of scan points collected during a single mechanical motion or sweep.

Several examples of mechanical positioning exist. On a typical terrestrial survey LIDAR, such as a Leica ScanStation C10, the mechanical positioning of the LIDAR may be achieved by vertically deflecting a field of view of the LIDAR with a vertical deflector and horizontally rotating the vertical deflector together with the LIDAR. In this way, a scanning field of view generally resembling a sphere may be achieved. In some airborne LIDAR systems, such as the Leica ALS70, the LIDAR may be deflected across a flight path by a deflector. The deflector and the LIDAR may be mounted to an aircraft. Similarly, in some ground-vehicle-based LIDAR systems, the LIDAR may be deflected about an environment as the vehicle moves along a path. A targeting wedge prism scanner may form a LIDAR field of view by passing a laser beam through two round wedge prisms, one rotating at a much slower speed than the second, thus creating a spiral LIDAR sampling path.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1:
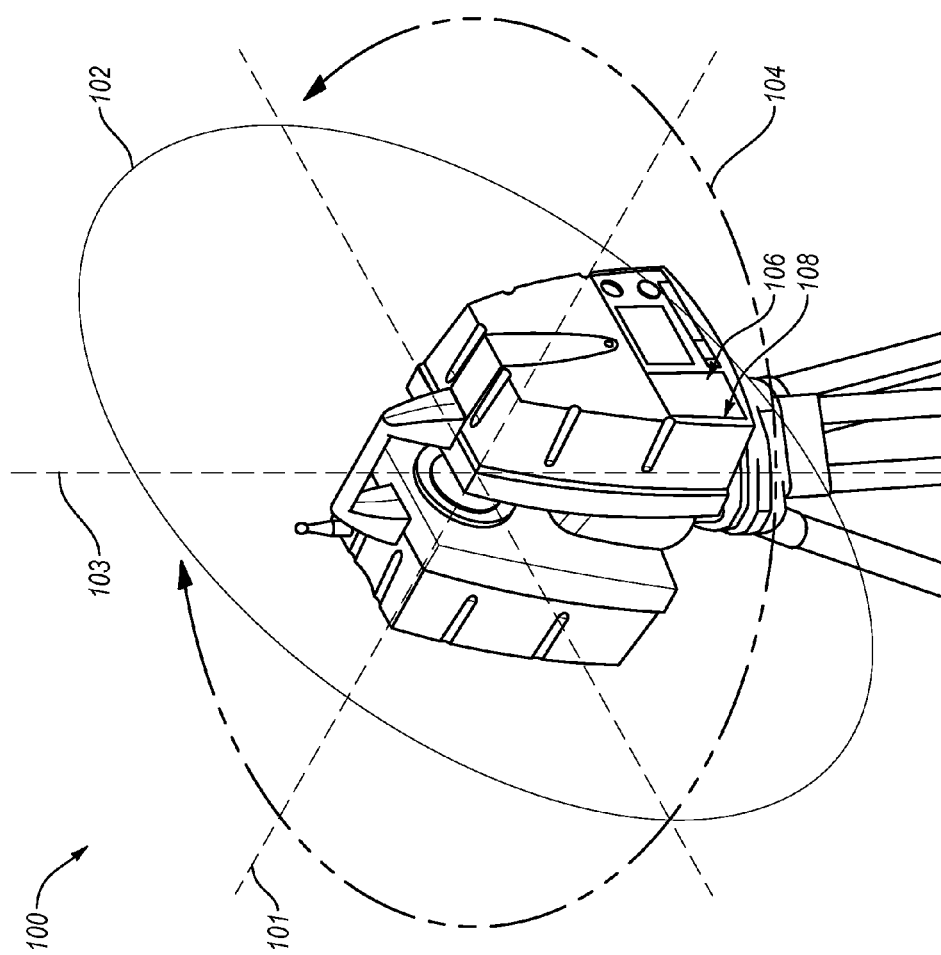
FIG. 1 is a perspective view of an example terrestrial laser scanner.

FIG. 1 is a perspective view of an example terrestrial laser scanner 100 including a diagrammatic representation of the kinematic behavior of the scanner 100. The scanner 100 may be configured to mechanically sweep a laser beam over a three-dimensional reality by rapidly rotating the laser beam about a substantially horizontal axis 101 and rotating the scanner 100 and/or the laser about a substantially vertical axis 103 incrementally and/or slowly relative to the rotation of the laser beam about the substantially horizontal axis 101. The angular position of the laser beam about the substantially horizontal axis 101 may be generally associated with an elevation 102 of the laser beam. The angular position of the laser beam about the substantially vertical axis 103 may be generally associated with an azimuth 104 of the laser beam.

The range samples generated by a LIDAR system may be represented as real (e.g., floating point) numbers. When stored or otherwise represented in a computer or other system, the numbers have a numerical precision associated with their format. For example, for a single precision IEEE-compliant floating point number representing a range of 1 meter, the next larger floating point number may represent a range difference of smaller than 1 micron. Most computer representations of numbers, such as single precision IEEE-compliant floating point, are collections of only a finite set of numbers, and the distribution of these numbers is generally clustered around 0 with several representations of 0.

However, uncertainty in the range values may make such a level of resolution unnecessary. Uncertainty in scan point range values may be driven by a mixture of noise sources, such as electronics noise, systematic offset, shot noise, clock frequency uncertainty, and the like. Some processes may contribute an uncertainty that may be considered independent of the range values ("range-independent uncertainty"). Other sources of uncertainty may depend on the range values ("range-dependent uncertainty"). For example, shot noise and clock frequency uncertainty may have significant range value dependence.

Figure 2:
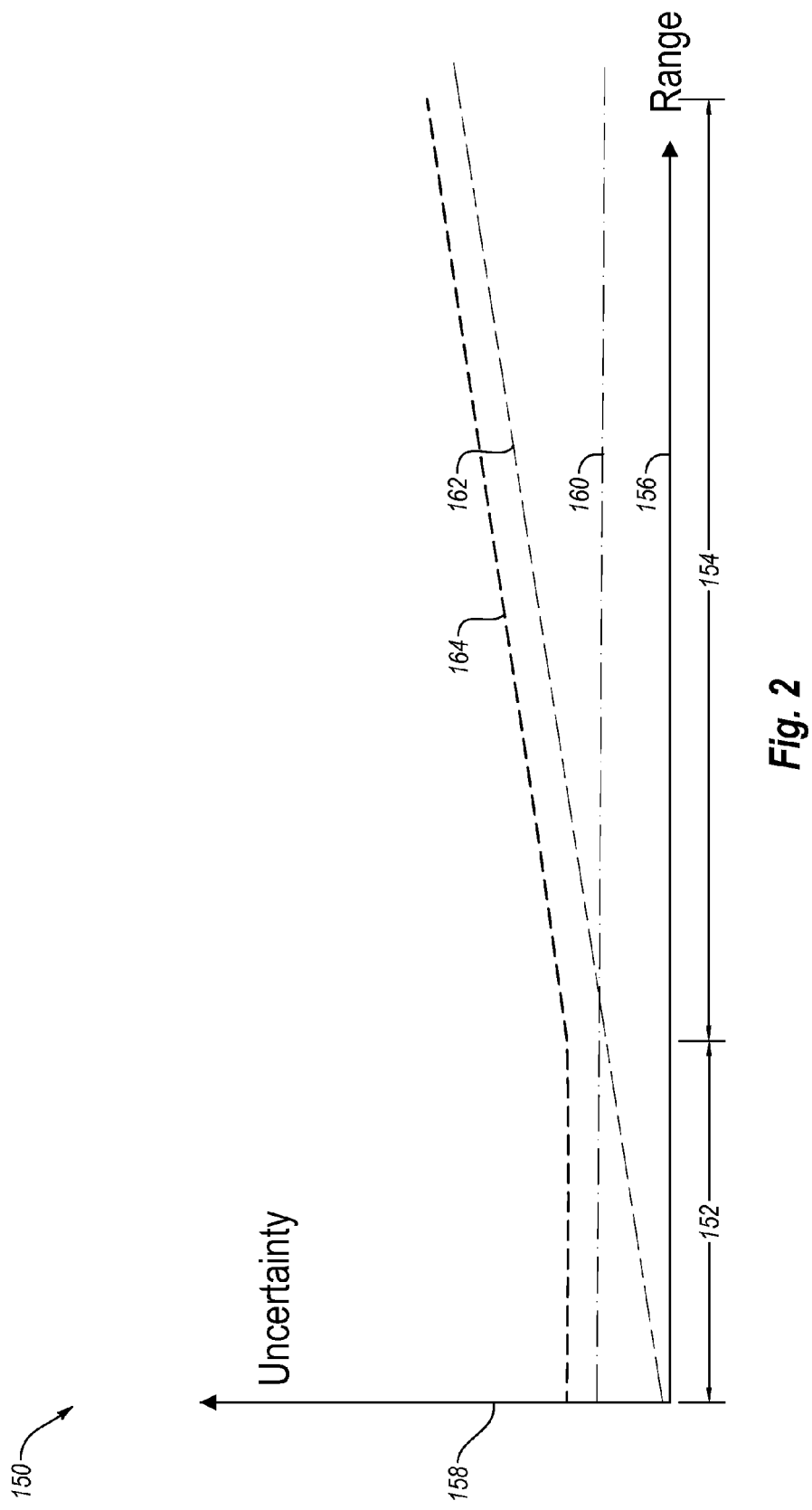
FIG. 2 is a graph of example uncertainty behavior that may be exhibited by the scanner of FIG. 1.

FIG. 2 is a graph 150 of example uncertainty behavior that may be exhibited by LIDAR systems. The uncertainty represented in FIG. 2 may be associated with a one-sigma or one-standard-deviation uncertainty. In this and other embodiments, the uncertainty may be associated with more than one standard deviation of uncertainty. The graph 150 includes an axis 156 representing a range value of scan points and an axis 158 representing an uncertainty. A first dashed line may represent range-independent uncertainty 160. A second dashed line may represent range-dependent uncertainty 162. A third dashed line may represent observed uncertainty 164. The relative differences between the observed uncertainty 164, and the range-independent uncertainty 160 and the range-dependent uncertainty 162 may be exaggerated for clarity.

The observed uncertainty 154 behavior may demonstrate a constant region 152. In some embodiments, the constant region 152 may occur approximately over range values where range-independent uncertainty 160 is relatively higher than range-dependent uncertainty 162.

The observed uncertainty 164 may additionally demonstrate a linear region 154. In some embodiments, the linear region 154 may occur at range values above those in the constant region. For example, the linear region 154 may occur approximately over range values where range-dependent uncertainty 160 is relatively higher than range-independent uncertainty.

In those and other embodiments, the observed uncertainty 164 may additionally demonstrate a quadratic region. A quadratic region may occur at range values above those in the linear region 154. Alternately or additionally, a quadratic region may occur where the laser beam size is larger than the target, and/or with structured light and photogrammetry based data (e.g., triangulation-based systems of three-dimensional capture).

In this and other embodiments, the uncertainty behavior may additionally demonstrate a cubic region. The cubic region may occur at range values above those in the quadratic region.

Figure 3:
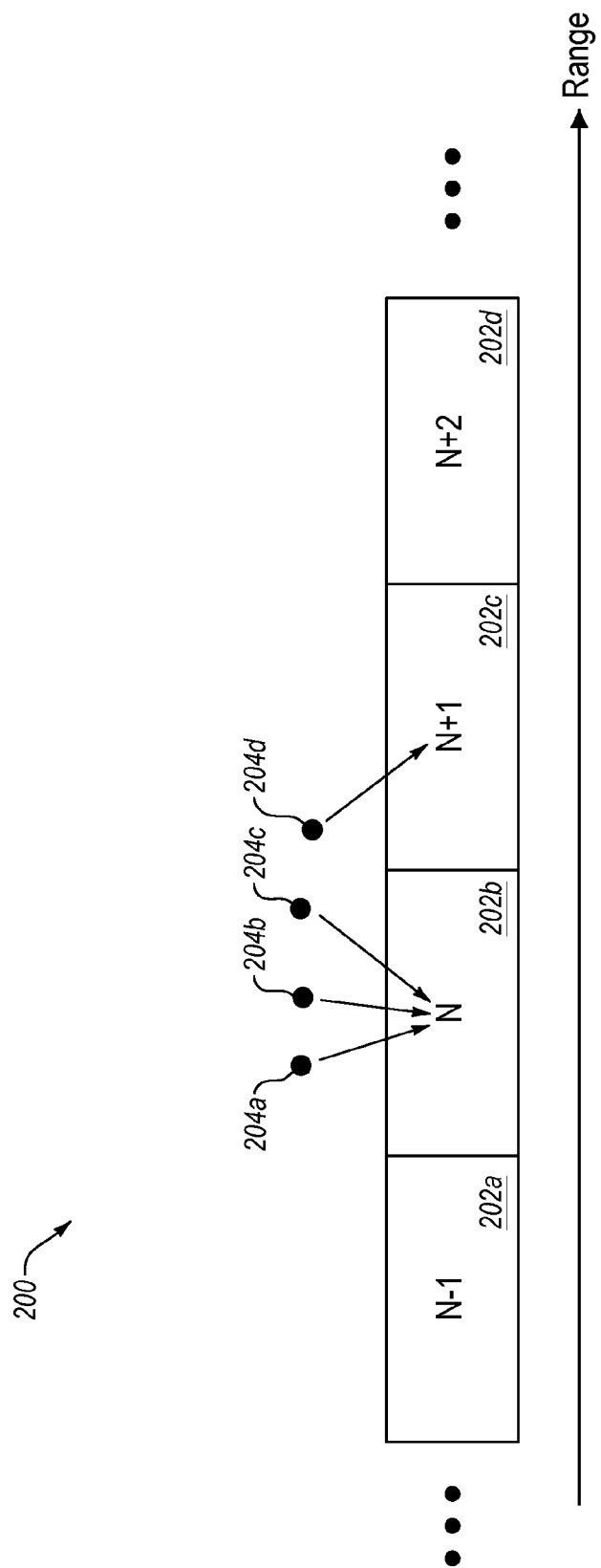
FIG. 3 is a diagram of example range mapping.

Referring again to FIG. 1, the scanner 100 may include a compression module 106 and/or data storage 108. In some embodiments, the FIG. 3 is a diagram of example range mapping 200. In some embodiments, the range mapping 200 may be performed by the compression module 106 of FIG. 1. The range mapping 200 may include range equivalence intervals 202a-d (collectively "range equivalence intervals 202"). The range equivalence intervals 202 may also be described as buckets. In some instances, the range equivalence intervals 202 may have a range interval size of $R_\epsilon$, which may be described herein as a range resolution. In some embodiments, the range interval size may be chosen to be smaller than the smallest range uncertainty over range. In some embodiments, the range interval size may be a fraction of the smallest range uncertainty.

The range equivalence intervals 202 may be designated using integers. Scan points 204a-d (collectively "scan points 204") may be associated with a particular one of the range equivalence intervals 202. For example, the scan points 204a-c may be associated with the range equivalence interval 202b associated with the integer N. The scan point 204d may be associated with range equivalence interval 202c associated with the integer N+1. Because of uncertainty in the range values, scan points associated with the same interval may be considered to have the same range without a loss of accuracy. For example, the scan points 204a-204c may be considered to have the same range without loss of accuracy. Thus, the range data of a scan may be written without loss of accuracy.

Some conventional LIDAR systems may employ constant range interval sizes. For example, the range interval size may be equal to a single $R_\epsilon$ for all range values. In these conventional LIDAR systems, the range resolution, and thus the range interval size, may be chosen to be some multiple of times smaller than an observed range uncertainty at a relatively close range. For example, $R_\epsilon$ may have a value some multiple of times smaller than a minimum observed range uncertainty. Thus, for example, for all ranges the range data may be written to integers representing constant range interval sizes without loss of the accuracy. However, using constant range interval sizes may lead to inefficiencies when encoding range data associated with linear, quadratic, cubic, and other non-constant uncertainty models.

In some embodiments, range-dependent range equivalence intervals may be used. By way of example, range-dependent range equivalence intervals may be relatively more efficient than constant range equivalence intervals when encoding data associated with linear, quadratic, cubic, and other non-constant uncertainty models. The size of the intervals may generally be matched to a fraction of the uncertainty of the range measurement, so that when the range data is compressed, relevant information is not lost.

Figure 4:
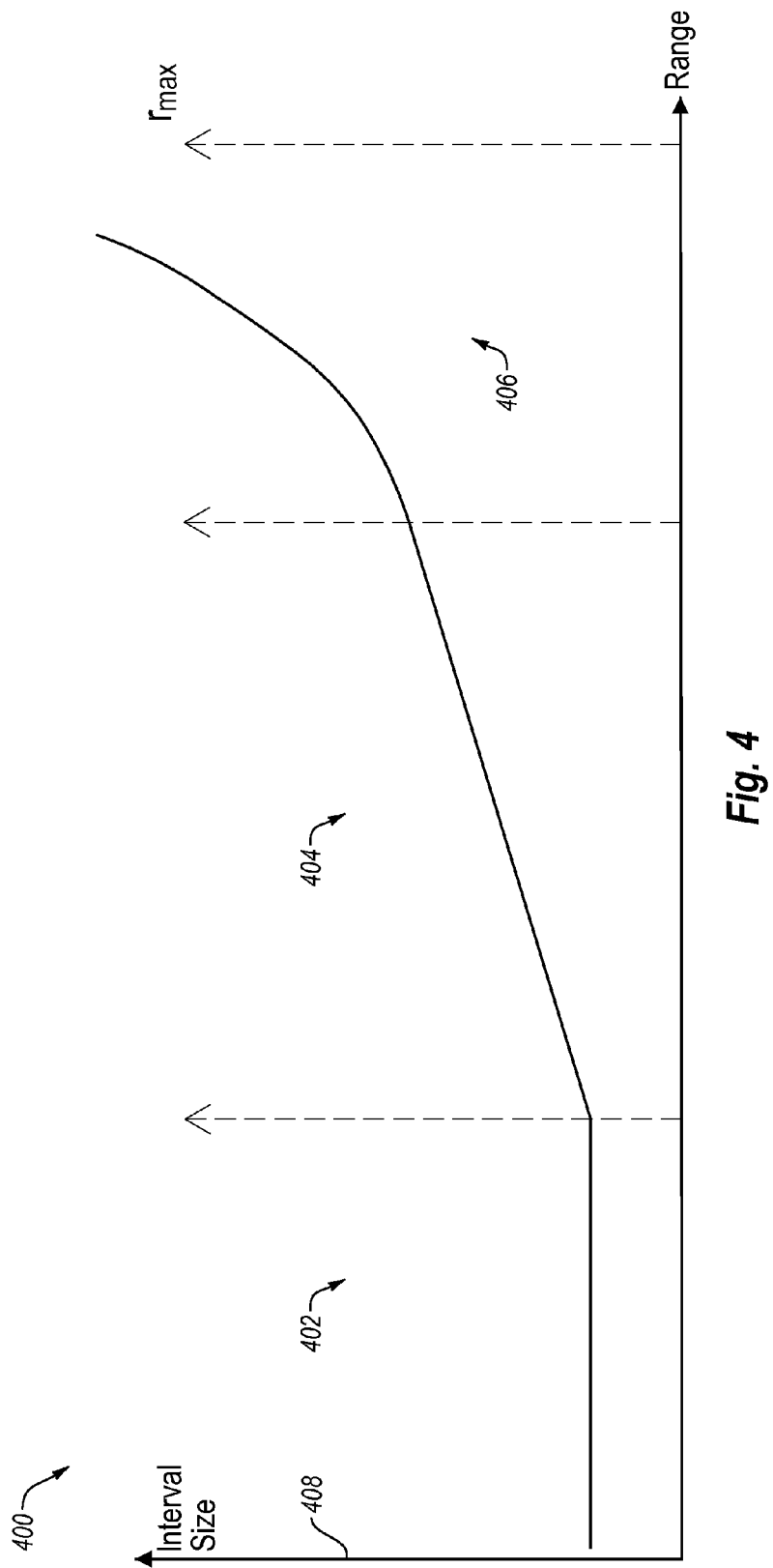
FIG. 4 is a graph of an example relationship of range equivalence interval sizes to range values.

FIG. 4 is a graph 400 of an example relationship of range equivalence interval sizes to range values. The graph 400 includes an axis 408 representing a range value of scan points and an axis 410 representing an interval size of range equivalence intervals. In some embodiments, the range equivalence intervals may be divided into range regions having models of increasing power, such as a constant region 402, a linear region 404, and a quadratic region 406. The range equivalence intervals of each region may be sized as to provide a mapping of ranges to integers without loss of accuracy. In some embodiments, the size of the range equivalence intervals may be a function of range according to an interval size function. The graph 400 shows the range equivalence interval size as continuous relative to the range. However, in some embodiments, the interval size may not be continuous.

Using range equivalence intervals with the size of the range equivalence intervals dependent on the associated values of the ranges may allow for more efficient compression of scan data. For example, in some embodiments, using range equivalence intervals with the size of the range equivalence intervals dependent on the associated values of ranges may allow for relatively larger range equivalence intervals to be used. Thus, for example, the resulting scan data may take up less space in storage, such as the storage 108 of FIG. 1, without a loss of accuracy. Furthermore, for example, the resulting scan data may be more easily transferred.

In some embodiments, range-integer mapping may be described by a set of corresponding range regions, integer regions, and polynomials described herein as interval sets. The intervals sets may be denoted as $I_i$, where i may represent the interval set number. In some embodiments, $I_i$ may be expressed generally as:

$$I_i = \left\{ \begin{array}{c} [p_0 p_1 \ldots] \\ [r_0 r_1] \\ [n_0 n_1] \end{array} \right\}_i$$

For example, in the graph 400, $I_0$ may describe the range-integer mapping for the constant region 402, $I_1$ may describe the range-integer mapping for the linear region 404, and $I_2$ may describe the range-integer mapping for the quadratic region 406.

In some embodiments, the size of the range equivalence intervals may be determined via polynomial equations denoted as:

$$[p_0 p_1 \ldots]_i$$

Where i may represent a polynomial equation number corresponding to the interval set number, $p_0$ may represent a coefficient of a first term of a polynomial, $p_1$ may represent a coefficient of a second term of the polynomial, and $p_n$ may represent a coefficient of a last term of the polynomial.

The range regions may be denoted as:

$$[r_0 r_1]_i$$

Where $r_0$ may represent a starting range value of the range region, $r_1$ may represent an ending range value of the range region, and i may represent a range region number corresponding to the interval set number.

The integer regions may be denoted as:

$$[n_0 n_1]_i$$

Where $n_0$ may represent a starting integer of the integer region, $n_1$ may represent an ending integer of the integer region, and i may represent an integer region number corresponding to the interval set number.

For the range regions and the integer regions, one, both, or neither end may be open.

The collection of interval sets may cover the scope of ranges without gaps. For example, for every r in $[r_{min} r_{max}]$, where $r_{min}$ represents a minimum range value and $r_{max}$ represents a maximum range value, there may exist only one i where r falls within the corresponding range region $[r_0 r_1]$. Alternately or additionally, for every n in $[n_{min} n_{max}]$, where $n_{min}$ represents a minimum integer value and $n_{max}$ represents a maximum integer value, there may exist only one i where n falls within the corresponding integer region $[n_0 n_1]$.

In some embodiments, the overall integer interval may be a power of 2 and may be in byte sizes. For example, $n_{min}$ may equal 0 and/or $n_{max}$ may equal $2^{16}$, $2^{24}$, $2^{32}$, or the like.

Regarding the overall range interval, $r_{min}$ may equal 0. Alternately or additionally, by way of example, for triangulation-based systems such as structured light systems, $r_{max}$ may be set to some tens of meters. For terrestrial LIDAR systems $r_{max}$ may be set to some hundreds of meters. For airborne LIDAR systems $r_{max}$ may be set to some thousands of meters. However, the integer and/or range intervals may be offset and/or scaled with little computational cost.

In an example embodiment, range compression for an example terrestrial LIDAR system may include a constant region, a linear region, an $r_{min}$ of 0 meters, an $r_{max}$ of 400 meters, and a threshold range of 15 meters where the constant region and the linear region meet.

In this example embodiment, the constant region may cover range values between 0 and 15 meters. For the constant region, the constant interval size may be 1 millimeter (mm), which may represent a residual error of +/−0.5 mm. The linear region may cover range values between 15 meters and 400 meters and the interval size may increase by 1 mm per 15 meters of range. This set of parameters corresponds to mapping ranges in $[r_{min}$ to $r_{max}]$ to integers in $[0, 2^{16}]$. Thus, for example, the range of integers may span 16 bits by way of comparison, if the entire set of ranges were mapped using a constant region, the range of integers required would span 19 bits.

Optionally, the interval sizes of the constant region and the linear region may be made to match at the threshold range (e.g., at a range of 15 meters). The interval sets $I_0$ and $I_1$, as well as $n_{max}$ may be determined based on the threshold range of 15 meters, the constant interval size of 1 mm, and the 0 to 400 meter range interval. For example, the interval sizing and the threshold range may prompt the use of 64,252 integers to map the range interval. The $n_{max}$ and the $n_1$ of the interval set $I_1$ may be set equal to $2^{16}$ (65,535) for a 16-bit range representation, which may be the byte size which represents the integers for mapping the range interval. The 16-bit range representation may be smaller than in a conventional system using a constant interval size for all ranges. By way of example, in some conventional systems, ranges up to only 65.5 meters could be stored using a 16-bit range representation.

In this example embodiment, the interval set $I_0$ may be expressed as:

$$I_0 = \left\{ \begin{array}{c} [0.001] \\ [0\ 15] \\ [0\ 15,000] \end{array} \right\}_0$$

The interval set $I_1$ may be expressed as:

$$I_1 = \left\{ \begin{array}{c} \left[0\ \frac{0.001}{15}\right] \\ [15\ 400] \\ [15,000\ 65,535] \end{array} \right\}_1$$

In some embodiments, for a system including a constant region and a linear region, an integer N may be determined from a range R and/or the range R may be determined from the integer N from the following formulas:

$$\alpha = \frac{r_\varepsilon}{r_{th}}$$

$$N_0 = \text{floor}\left(\frac{1}{\alpha}\right)$$

$$R_0 = \frac{r_{th}}{(1+\alpha)^{N_0}}$$

Function: integer $N$ to range $R$,

If $N \leq N_0$, $R = r_\varepsilon N$

Else, $R = R_0(1+\alpha)^N$

Function: range $R$ to integer $N$,

If $R < r_{th}$, $N = \text{floor}\left(\frac{R}{r_\varepsilon} + 0.5\right)$

Else, $N = \frac{\log\left(\frac{R}{R_0}\right)}{\log(1+\alpha)}$

Where $r_{th}$ may represent the threshold range and $r_\varepsilon$ may represent a given constant interval size.

A value for $n_{max}$ may be determined via the following formula:

$$n_{max} = \frac{\log\left(\frac{r_{max}}{R_0}\right)}{\log(1+\alpha)}$$

In some embodiments, the determined value of $n_{max}$ may be rounded up to the nearest byte value, such as $2^{16}$, $2^{24}$, $2^{32}$, or the like.

In some embodiments, an interval size for a for a particular range $R_n$ may be determined via the following formula:

IntervalSize($R_n$)=$R_{n+1}-R_n=\alpha R_n$

Figure 5:
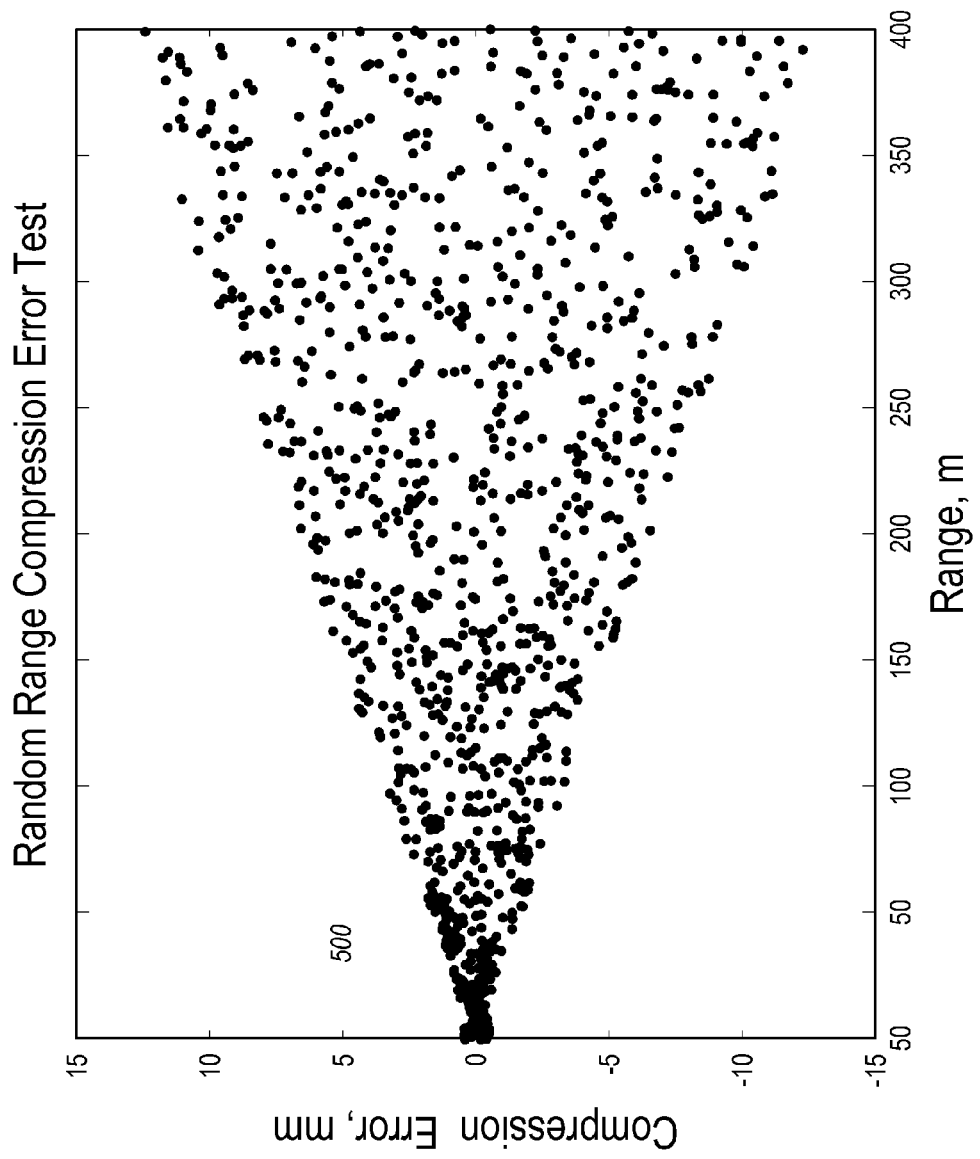
FIG. 5 is a graph of example range compression residual errors.

FIG. 5 is a graph 500 of example range compression residual errors that may be exhibited by the example compression process described above. The graph 500 may represent the difference between a random distribution of ranges and an uncompressed, compressed version of the same range. As demonstrated by the graph 500, the residual error may be substantially uniformly distributed in the equivalence interval. In some embodiments, the compression errors represented by the graph 500 may be relatively smaller than the uncertainty errors of an associated LIDAR system.

Figure 6:
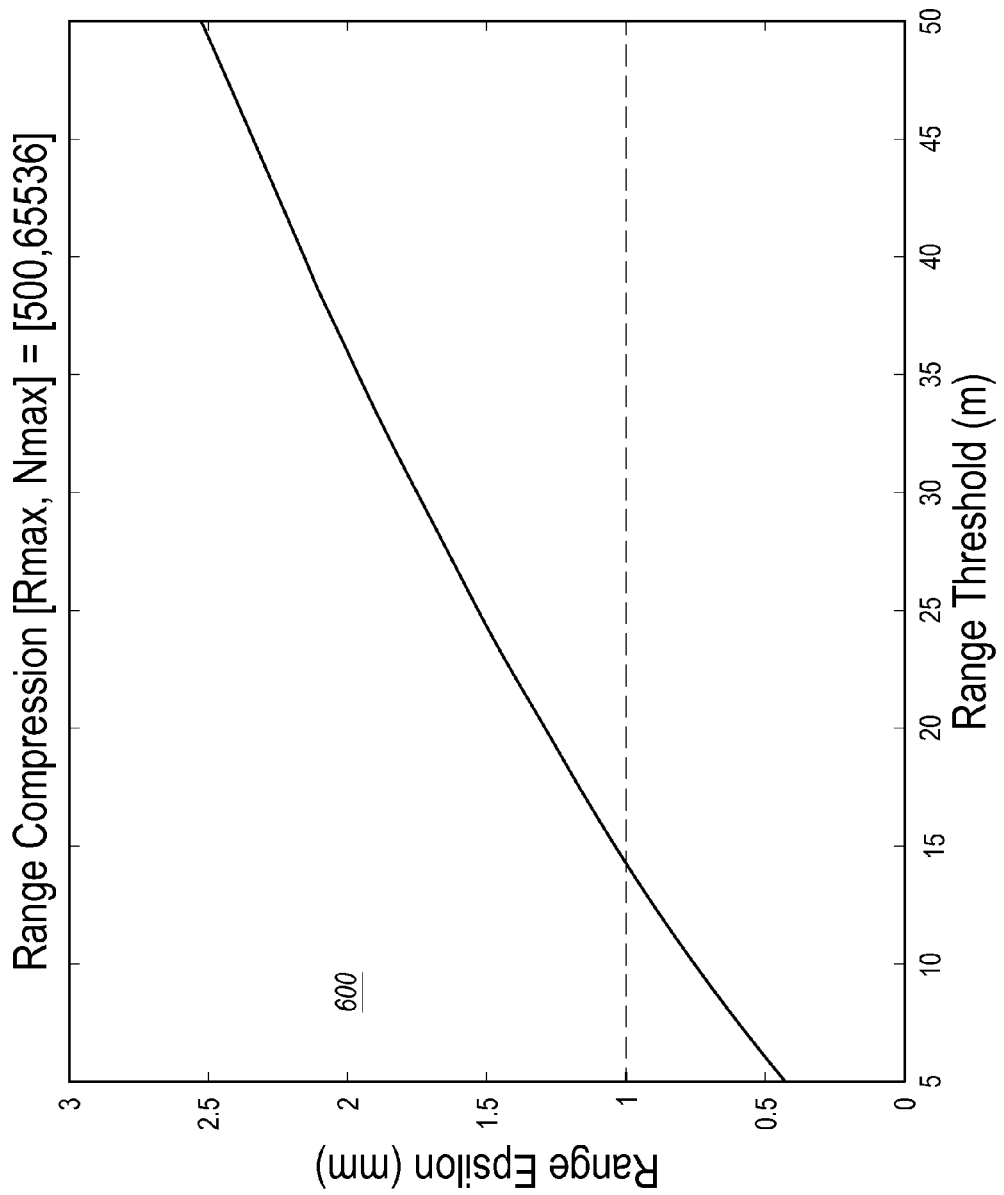
FIG. 6 is an example constant interval size $r_\epsilon$ selection graph.

FIG. 6 is an example constant interval size $r_\varepsilon$ selection graph 600 for 16-bit range representation and a 500 meter $r_{max}$. The example $r_\varepsilon$ selection graph 600 graphs $r_\varepsilon$ over threshold ranges ($r_{th}$) from 5 meters to 50 meters. Given a fixed maximum range and fixed maximum integer value, the selection of the threshold range $r_{th}$ may determine the smallest range resolution, $r_\varepsilon$. The smaller a near range resolution $r_\varepsilon$ is selected, the shorter the range $r_{th}$ at which this small constant resolution abandoned for a linear growth.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laser imaging, detection, and ranging (LIDAR) system comprising:
   a scanner configured to generate a scan including a plurality of scan points and a plurality of range values, each range value of the plurality of range values associated with a different scan point of the plurality of scan points; and
   a compression module configured to map each range value of the plurality of range values to an integer of a plurality of integers, the plurality of integers representing a plurality of range intervals associated with the range values of the plurality of range values of the scan, wherein the plurality of range intervals include a plurality of differently sized range intervals, and wherein the size of the range intervals of the plurality of range intervals is a function of range according to an interval size function.

2. The LIDAR system of claim 1, wherein the interval size function includes a polynomial function.

3. The LIDAR system of claim 1, wherein the interval size function is defined for a plurality of regions of ranges and integers, and
wherein the interval size function includes a plurality of regional interval size functions associated with the plurality of regions of ranges and integers.

4. The LIDAR system of claim 3, wherein the interval size function is continuous over the plurality of regions of ranges and integers.

5. The LIDAR system of claim 4, wherein the interval sizes are proportional to a range uncertainty of the LIDAR system for associated range values of the plurality of range values.

6. The LIDAR system of claim 3, wherein the plurality of regions includes a constant region and a linear region.

7. The LIDAR system of claim 6, wherein the plurality of regions further includes a quadratic region.

8. The LIDAR system of claim 7, wherein the plurality of regions further includes a cubic region.

9. The LIDAR system of claim 1, wherein the scanner includes a terrestrial laser scanner.

10. The LIDAR system of claim 1, wherein the scanner includes an aircraft-based scanner.

11. The LIDAR system of claim 1, wherein the scanner includes a ground-vehicle-based scanner.

12. The LIDAR system of claim 1, wherein the scanner includes a targeting wedge prism scanner.

13. The LIDAR system of claim 1, wherein the scanner includes a vertical deflector configured to rotate a laser beam about a substantially horizontal axis, the scanner further configured to rotate the vertical deflector about a substantially vertical axis.

14. A method of compressing scan data, the method comprising:
generating, at a laser imaging, detection, and ranging (LIDAR) system, a scan including a plurality of scan points and a plurality of range values, each range value of the plurality of range values associated with a different scan point of the plurality of scan points; and
mapping, at the LIDAR system, each range value of the plurality of range values to an integer of a plurality of integers representing a plurality of differently sized range intervals associated with the range values of the plurality of range values of the scan,
wherein the size of the range intervals of the plurality of differently sized range intervals is a function of range according to an interval size function.

15. A method of claim 14, wherein the interval size function includes a polynomial function.

16. A method of claim 14, wherein the interval size function is defined for a plurality of regions of ranges and integers, and
wherein the interval size function includes a plurality of regional interval size functions associated with the plurality of regions of ranges and integers.

17. A method of claim 16, wherein the interval size function is continuous over the plurality of regions of ranges and integers.

18. A method of claim 16, wherein the interval sizes are proportional to a range uncertainty of a LIDAR system for associated range values of the plurality of range values.

19. A method of claim 18, wherein the plurality of regions of ranges and integers include a constant interval size region and a linear region.

20. A terrestrial laser imaging, detection, and ranging (LIDAR) comprising:
a scanning device configured to generate a scan including a plurality of scan points and a plurality of range values, each range value of the plurality of range values associated with a different scan point of the plurality of scan points; and
a compression module configured to map each range value of the plurality of range values to an integer of a plurality of integers, the plurality of integers representing a plurality of range intervals associated with the range values of the plurality of range values of the scan,
wherein the plurality of range intervals include a plurality of differently sized range intervals,
wherein the size of the range intervals of the plurality of range intervals is a function of range according to an interval size function defined for a plurality of regions of ranges and integers, the interval size function defining:
a constant interval size region associated with a first region of ranges, and
a linear region associated with a second region of ranges, and
wherein the size of the range intervals of the first region of ranges is based at least in part on range-independent uncertainty associated with the scanning device and the size of the range intervals of the second region of ranges is based at least in part on range-dependent uncertainty associated with the scanning device.

* * * * *